United States Patent
Astrom et al.

(10) Patent No.: US 9,954,598 B2
(45) Date of Patent: Apr. 24, 2018

(54) HIGH CAPACITY CELLULAR COMMUNICATIONS SYSTEM COVERAGE OF AIRBORNE MOBILE COMMUNICATIONS EQUIPMENT

(71) Applicant: Telefonaktiebolaget L M Ericsson (publ), Stockholm (SE)

(72) Inventors: Magnus Astrom, Lund (SE); Joakim Axmon, Kavlinge (SE); Bengt Lindoff, Bjarred (SE); Johan Nilsson, Hollviken (SE); Peter Alriksson, Horby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 53 days.

(21) Appl. No.: 14/931,063

(22) Filed: Nov. 3, 2015

(65) Prior Publication Data
US 2017/0126308 A1   May 4, 2017

(51) Int. Cl.
*H04B 7/185*  (2006.01)
*H04L 5/00*  (2006.01)
(Continued)

(52) U.S. Cl.
CPC ....... *H04B 7/18506* (2013.01); *H04B 7/0617* (2013.01); *H04L 5/0048* (2013.01);
(Continued)

(58) Field of Classification Search
CPC ...... H04B 7/18506; H04B 7/19; H04B 7/195; H04B 7/02; H04B 7/028; H04B 7/04;
(Continued)

(56) References Cited

U.S. PATENT DOCUMENTS 8,688,101 B1   4/2014   Hayes et al.
8,914,022 B2   12/2014  Kostanic et al.
(Continued)

FOREIGN PATENT DOCUMENTS

CN   103873133 A   6/2014
CN   204103537 U   1/2015
(Continued)

OTHER PUBLICATIONS

PCT International Search Report, dated Dec. 19, 2016, in connection with International Application No. PCT/EP2016/072624, all pages.

(Continued)

*Primary Examiner* — Magdi Elhag
(74) *Attorney, Agent, or Firm* — Leffler Intellectual Property Law, PLLC

(57) ABSTRACT

Telecommunications service is provided to mobile equipment aboard an airborne aircraft. A master coordination node (MCN) coordinates communication from groups of subordinate nodes in the network such that each group communicates a different layer of data to the mobile communication equipment aboard the aircraft. Each group of subordinate nodes transmits beam steered, Doppler shift compensated downlink signals directed at the aircraft. Coordination controls the timing of transmissions from the subordinate nodes so as to have signals received by the mobile communication equipment from the groups of subordinate nodes keep within a required temporal delay of a cyclic prefix in the received signals; the Doppler shift pre-compensation performed by each subordinate node such that the mobile communication equipment aboard the aircraft experiences a nominal carrier frequency when receiving transmissions from each of the subordinate nodes; and ensuring mutual compatibility of the
(Continued)

signals transmitted by each of the groups of subordinate nodes.

13 Claims, 7 Drawing Sheets

(51) Int. Cl.
| | |
|---|---|
| *H04W 16/28* | (2009.01) |
| *H04W 24/08* | (2009.01) |
| *H04W 28/02* | (2009.01) |
| *H04B 7/06* | (2006.01) |
| *H04W 84/00* | (2009.01) |
| *H04L 29/08* | (2006.01) |
| *H04W 84/04* | (2009.01) |

(52) U.S. Cl.
CPC ............ *H04L 5/0053* (2013.01); *H04L 67/12* (2013.01); *H04W 16/28* (2013.01); *H04W 24/08* (2013.01); *H04W 28/0226* (2013.01); *H04W 84/005* (2013.01); *H04W 84/042* (2013.01)

(58) Field of Classification Search
CPC ... H04B 7/0408; H04B 7/0691; H04L 5/0048; H04L 5/0053; H04W 16/28; H04W 24/08; H04W 28/0226
See application file for complete search history.

(56) References Cited

U.S. PATENT DOCUMENTS

| | | | |
|---|---|---|---|
| 9,008,669 | B2 | 4/2015 | Hyslop et al. |
| 2006/0229077 | A1 | 10/2006 | Monk |
| 2006/0239238 | A1 | 10/2006 | Fernandez-Corbaton et al. |
| 2007/0161347 | A1 | 7/2007 | Ma et al. |
| 2009/0186611 | A1 | 7/2009 | Stiles et al. |
| 2011/0182230 | A1* | 7/2011 | Ohm ............ H04B 7/185 370/315 |
| 2011/0189943 | A1 | 8/2011 | Ilarregui et al. |
| 2014/0177461 | A1* | 6/2014 | Seyedmehdi ......... H04B 7/026 370/252 |
| 2014/0266896 | A1 | 9/2014 | Hyslop |
| 2015/0098415 | A1* | 4/2015 | Chen ............ H04L 5/0035 370/329 |
| 2015/0146692 | A1 | 5/2015 | Yi et al. |
| 2016/0212669 | A1 | 7/2016 | Davis |
| 2017/0127332 | A1 | 5/2017 | Axmon et al. |
| 2017/0155442 | A1 | 6/2017 | Hommel et al. |

FOREIGN PATENT DOCUMENTS

| | | |
|---|---|---|
| EP | 1976152 A1 | 10/2008 |
| EP | 2161855 A1 | 3/2010 |
| EP | 2214328 A2 | 8/2010 |
| EP | 2278732 A2 | 1/2011 |
| WO | WO9945609 A1 | 9/1999 |
| WO | 2006105316 A2 | 10/2006 |
| WO | 2013010370 A1 | 1/2013 |

OTHER PUBLICATIONS

PCT Written Opinion, dated Dec. 19, 2016, in connection with International Application No. PCT/EP2016/072624, all pages.
Yogesh Anil Nijsure et al., Adaptive Air-to-Ground Secure Communication System Based on ADS-B and Wide-Area Multilateration, IEEE Transactions on Vehicular Technilogy, 17 pages.
ETSI TR 103 054 V1.1.1 (Jul. 2010), Electromagnetic compatibility and Radio spectrum Matters (ERM); System Reference Document; Broadband Direct-Air-to-Ground Communications operating in part of the frequency range from 790 MHz to 5 150 MHz, 23 pages.
ETSI TR 103 108 V1.1.1 (Jul. 2013), Electromagnetic compatibility and Radio spectrum Matters (ERM); System Reference document (SRdoc); Broadband Direct-Air-to-Ground Communications System operating in the 5,855 GHz to 5,875 GHz band using 3G technology, 25 pages.
ETSI TR 101 599 V1.1.3 (Sep. 2012), Electromagnetic compatibility and Radio spectrum matters (ERM) System Reference Document (SRDoc); Broadband Direct-Air-to-Ground Communications System employing beamforming antennas, operating in the 2,4 GHz and 5,8 GHz bands, 31 pages.
PCT International Search Report, dated Jan. 23, 2017, in connection with International Application No. PCT/EP2016/075683, all pages.

* cited by examiner

Receiver antenna array

HIGH CAPACITY CELLULAR COMMUNICATIONS SYSTEM COVERAGE OF AIRBORNE MOBILE COMMUNICATIONS EQUIPMENT

BACKGROUND

The present invention relates to connectivity between land-based cellular communications systems and user equipment located in airborne craft.

The smartphone has allowed people to be connected anywhere and anytime. This has led consumers to have increasing expectations of being able to be online and experience at least moderate data rates in locations that have traditionally not provided good connectivity, such as in-flight aboard an aircraft. Having shown little progress so far, the smartphone changed the need for this greater connectivity starting in the middle of the first decade of the twenty-first century. Now it is a steadily growing branch of communications, still early in its development and far from the performance seen in cellular or WiFi networks, where streaming video or other high bandwidth services totaling several hundreds of Mbps may be supplied for each eNodeB ("eNB") or Access Point (AP). Due to limited alternative activities, a scenario with several hundreds of parallel video streams is not unlikely in an airborne device acting as a relay or access point to the user equipments (UEs) in the aircraft. Today two main technologies exist for in-flight communications, that is, communications to and from the ground to a commercial airplane. One is a ground based cellular network, the other, which comes in several variations, is satellite based.

New antenna techniques allow for higher channel capacity, for example by also utilizing the polarization plane in the transmissions such that vertical, horizontal and left or right circular polarization may be differentiated from one another. With new antenna array or planar array techniques, new possibilities for beamforming arise. By using arrays, it is possible to focus the transmitted energy in a beam in a specific direction in space. The antenna gain in the relevant direction compared to an isotropic antenna is approximately $10*\log(N)$, where N is the number of elements in the array, ignoring antenna imperfections. A 64 element array would thus in theory have an antenna gain of 18 dBi. Combining this kind of antenna gain with an eNB output power of 46 dBm, the signal-to-noise ratio (SNR) at a range of 100 km would still be 54 dB using the free space path loss model! The line of sight (LoS) case is particularly attractive since the optimal beam direction is typically nothing else but the direction of the receiver from the transmitter's point of view. One advantage with LoS beamforming is reciprocity (i.e., similarity of link characteristics) between the uplink and downlink directions in frequency division duplex (FDD) systems. Since the direct beam (direction) will comprise almost all of the signal energy, it is possible to use uplink beam estimates also for downlink transmissions only compensating for the phase difference arising from the frequency difference between the two links.

Other technologies, such as Global Positioning System (GPS), allow for highly accurate time displacement measurements for different receiver nodes relative to a transmitter node. Accurate time displacement is particularly necessary in long range communications where the link latency could otherwise destroy the connection due to, for example, latency differences exceeding a cyclic prefix length in Orthogonal Frequency Division Multiplexing (OFDM) based communications.

Combining what is known about the above-mentioned technologies, it is possible to derive the parameters for generating LoS beams for both the transmitter and receiver antenna arrays without the use of traditional pilot sequences. (Pilots are still necessary for phase information, though, although these could be spaced much more sparsely.) In a richly scattering environment, usually assumed in land based communications and well known in the art, a channel estimate, H, is estimated from pilot sequences received from various rays of the scattered transmitted signal. In such an environment, Multiple-Input Multiple-Output (MIMO) principles allow construction of an independent data stream ("layer") from a linear combination of signals from all transmitter antenna ports by controlling the phase and amplitude of each antenna port's output so as to cause each of the received signals to contribute constructively at the UE.

By contrast, in a LoS environment with no surrounding scatterers, the only way to achieve a spatially diversified MIMO transmission is for the transmitted layers to be spatially separated at their source, in order for the receiver antenna array to be able to resolve the different transmitters. In order to do so, different layers are transmitted by different eNBs (or unique groups of eNBs) and resolved at the receiver by beamforming in their corresponding directions. With reference to FIG. 1, in order to form the receiver (or transmitter) beams, the temporal difference, $\Delta t$, between an arriving wave at two neighboring antenna elements may be expressed as, $$\Delta t = \frac{d}{c}\sin\phi$$

where d is the antenna distance, c is the speed of light and $\varphi$ is the angle of the impinging wave. Alternatively, this expression may be reformulated using a normalized antenna distance, k, $d=k\lambda$, and $\Delta t=\theta\lambda/2\pi c$, in which instead the phase difference, $\theta$, between the two receiver elements becomes $\theta=2\pi k \sin \varphi.$ The corresponding beam forming is possible to perform at the transmitter side, both well known in the art.

The relation between the transmitted signal vector, x, and the received signal vector, y, in a MIMO system with the precoding matrix W, channel matrix H, and additive noise w is $y=HWx+w.$ Furthermore, assuming fixed channel attenuation, the channel vector $h_i$ between the $i^{th}$ transmitter antenna and the N element receiver antenna array is $$h_i = \begin{bmatrix} 1 \\ \vdots \\ e^{-j2\pi(N-1)\theta_i} \end{bmatrix}$$

Provided that all transmitter antennas are spatially separated, H will be orthonormal and hence invertible. Having obtained H, x may then be derived by, for example, zero forcing demodulation, $x=(H^H H)^{-1} H^H.$ Hence, by using an antenna array within an eNB and a UE, correspondingly, it is possible to form both transmitter beams and receiver beams, and also to demodulate the transmitted signal by using location and velocity data of an aircraft.

Other techniques exist in order to estimate H, for example by use of pilot based channel estimation and channel state information (CSI) feedback. However, in this case, existing a priori codebooks that are based on the Rayleigh model may not suit the special LoS case that land-to-air communications comprise.

Today there exist two main systems for in-flight communications, that is, communications to and from the ground to a commercial airplane. One is ground based using a code division multiple access (CDMA) Evolution Data Optimized (EV-DO) link with capacity limited to 10 Mbps. This system comprises thousands of dedicated base stations covering all of the US. Being a third generation communications system, it does not live up to the data rates that are demanded from today's user, even less so for 300 passengers highly limited in their options to busy themselves at 30 000 feet. It is not feasible for a single eNB to achieve spatial diversity on its own due to the non-reflective surroundings of free-space. Even if the surroundings of the eNB were to allow reflections, resulting in multiple beams from one eNB reaching the aircraft, these would be so attenuated that their contributions would only be marginal in relation to the line of sight component.

The second group of systems is satellite based in which either the Ku band at around 15 GHz or the Ka band at around 30 GHz is used. These services will rely on geostationary, high throughput satellites (HTS) and will provide connections of up to 200 Mbps to airborne nodes. Although throughput may not be an immediate bottleneck for this design, the latency of such a system will in practice result in significantly lower speeds than what is expected for a corresponding land based system. HTS use a Multi-User MIMO (MU-MIMO) system of their own in spot beam forming whereby individual beams cover a specific geographical area of Earth, from approximately 75 000 km$^2$ (roughly the size of South Carolina) and upwards, allowing the same time frequency resource to be reused multiple times in different beams. However, the satellite still only allows one beam to be directed at the same geographical area and the beam must be shared by all devices within that area, hence significantly reducing the capacity of a device. Cost, in terms of, for example, development, launching, manufacturing and maintenance is also a factor to be considered in a space based satellite system.

Hence there is a continued need for a standardized, affordable, ground based coordination method and/or device in which in-flight communications is managed by a ground-to-air-based system utilizing beams from multiple base stations on the ground in order to increase capacity in both downlink and uplink to airborne in-flight nodes.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology that provides cellular telecommunications system service to a mobile communication equipment aboard an aircraft that is airborne, wherein the method is performed by a master coordination node of a terrestrial cellular telecommunications system that further comprises other network nodes. The functionality includes coordinating communication from a plurality of groups of subordinate nodes selected from the other network nodes such that each group of subordinate nodes communicates a different layer of data to the mobile communication equipment aboard the aircraft, wherein:

each group of subordinate nodes comprises one or more other network nodes;
each group of subordinate nodes is mutually exclusive of other groups of subordinate nodes; and
each of the groups of subordinate nodes transmits beam steered, Doppler shift compensated downlink signals directed at the aircraft.

Further, coordinating communication from the plurality of groups of subordinate nodes comprises coordinating timing of transmissions from the groups of subordinate nodes so as to have signals received by the mobile communication equipment from the groups of subordinate nodes keep within a required temporal delay of a cyclic prefix in the received signals.

It also includes controlling Doppler shift pre-compensation performed by each of the groups of subordinate nodes such that the mobile communication equipment aboard the aircraft experiences a nominal carrier frequency when receiving transmissions from each of the groups of subordinate nodes.

It also includes coordinating communication parameters that control signals transmitted by each of the groups of subordinate nodes to ensure mutual compatibility of the signals transmitted by each of the groups of subordinate nodes.

In some but not necessarily all embodiments, master coordinate node functionality includes determining whether a candidate other network node will be a member of any of the groups of subordinate nodes based on a predicted level of interference caused by transmissions to the mobile communication equipment from the candidate other network node and affecting other transmissions directed to the mobile communication equipment.

In some but not necessarily all embodiments, master coordinate node functionality includes determining whether a candidate other network node will be dropped as a member of at least one of the groups of subordinate nodes based on an amount of beam interference with another mobile communication equipment located in a second aircraft travelling in a same trajectory as the first aircraft.

In some but not necessarily all embodiments, master coordinate node functionality includes determining whether a candidate other network node will be a member of any of the groups of subordinate nodes based on aircraft location data, and transmission measures pertaining to the mobile communication equipment and reported by the candidate other network node. In some but not necessarily all of these embodiments, the transmission measures include any one or more of: Doppler shift information, timing information indicative of signal travel time between the mobile communication equipment and the candidate other network node, precoding matrix, signal-to-noise ratio, and mutual information, all pertaining to the mobile communication equipment aboard the aircraft.

In some but not necessarily all embodiments, master coordinate node functionality includes determining whether a candidate other network node will be a member of any of the groups of subordinate nodes based on a likely capacity of a beam transmitted by the candidate other network node to the mobile communication equipment aboard the aircraft.

In some but not necessarily all embodiments, master coordinate node functionality includes receiving data from each of the groups of subordinate nodes, including position and velocity data of the aircraft as perceived by the groups of subordinate nodes. The Received data are then used to adjust the coordinating of timing of transmissions from the groups of subordinate nodes, the controlling of Doppler shift pre-compensation performed by each of the groups of subordinate nodes, and the coordinating of communication parameters that control signals transmitted by each of the groups of subordinate nodes. In some but not necessarily all of these embodiments, the data received from each of the groups of subordinate nodes comprises any one or more of: Doppler shift information, timing information indicative of signal travel time between the mobile communication equipment and one of the other network nodes, precoding matrix, signal-to-noise ratio, and mutual information.

Also, in some but not necessarily all embodiments, using the received data to adjust the coordinating of timing of transmissions from the groups of subordinate nodes, the controlling of Doppler shift pre-compensation performed by each of the groups of subordinate nodes, and the coordinating of communication parameters that control signals transmitted by each of the groups of subordinate nodes comprises deriving, from the received data, the communication parameters for each of the other network nodes that make up the groups of subordinate nodes; and communicating to each of the other network nodes that make up the groups of subordinate nodes, the communication parameters for said each of the other network nodes that make up the groups of subordinate nodes, wherein the communication parameters comprise one or more of: precoding matrix, Doppler shift, and timing information for controlling the timing of transmissions between air and ground.

In some but not necessarily all embodiments, the derived communication parameters comprise any one or more of Multiple Input/Multiple Output (MIMO) rank, Modulation and Coding Scheme (MCS), precoding matrix, and pilot pattern parameters.

In some but not necessarily all embodiments, master coordinate node functionality includes forwarding different layer data for transmission to the mobile communication equipment to respective ones of the other network nodes that make up the groups of subordinate nodes.

In some but not necessarily all embodiments, master coordinate node functionality includes using information about beam resolution at a location of the aircraft to select a subset of the groups of subordinate nodes; and causing only the subset of the groups of subordinate nodes to transmit signals directed to the mobile communication equipment aboard the aircraft.

In another aspect of some but not necessarily all embodiments consistent with the invention, technology is provided that communicates with a mobile communication equipment aboard an aircraft that is airborne, the functionality being carried out a subordinate node of a terrestrial cellular telecommunications system that further comprises other network nodes including a master coordinating node. The subordinate node functionality includes receiving reference signals from the mobile communication equipment aboard the aircraft, and deriving transmission data from the received reference signals. The derived transmission data are communicated to the master coordination node. In response, the subordinate node receives transmission parameters from the master coordination node. The subordinate node also obtains layer data to be transmitted to the mobile communication equipment aboard the aircraft; and then uses the received transmission parameters to control transmission of the obtained layer data to the mobile communication equipment aboard the aircraft.

In some but not necessarily all embodiments, the derived transmission parameters include one or more of: timing information for controlling the timing of transmissions between air and ground, precoding matrix, signal-to-noise ratio, and Doppler frequency shift for the subordinate node relative the mobile communication equipment.

In some but not necessarily all embodiments, the received transmission parameters include one or more of: Modulation and Coding Scheme (MCS), precoding matrix, and pilot pattern parameters.

In some but not necessarily all embodiments, the received transmission parameters further include one or more of: compensation for Doppler shift, and timing mismatch.

In some but not necessarily all embodiments, the functionality also comprises receiving additional signals from a transponder aboard the aircraft.

In some but not necessarily all embodiments, the received reference signals are pilot data received via an antenna array or a planar antenna array.

BRIEF DESCRIPTION OF THE DRAWINGS

The objects and advantages of the invention will be understood by reading the following detailed description in conjunction with the drawings in which.

DETAILED DESCRIPTION

Figure 1:
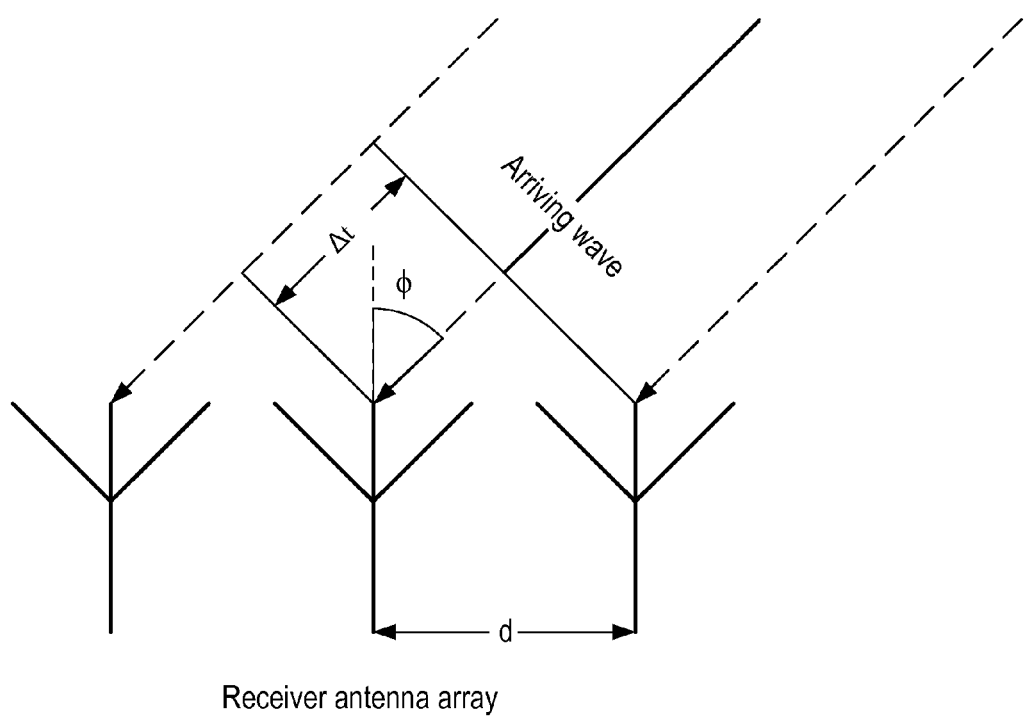
FIG. 1 illustrates the relation between arriving wave angle and temporal delay at a receiver antenna array.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

It will be further recognized that in each of the embodiments, the various actions can be performed by server circuitry that makes its functionality available to nodes as a service that is accessible by means of the Internet or similar data network (i.e., available via "the cloud").

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

Further, in some instances the description of embodiments may use the term "airplane". However, this is not intended to limit the invention in any way, and any such usage should be construed more broadly, for example as if the term "aircraft" (which encompasses not only airplanes, but other flying craft) had been used.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of the technology described herein, communication from several subordinate nodes (e.g., eNBs) or groups of subordinate nodes to airborne in-flight nodes is coordinated such that the spatial diversity existing between the different subordinate nodes and an aircraft is utilized to increase the data rates to the airborne node. Spatial diversity is already used in some existing terrestrial communication systems (e.g., the 3GPP's LTE system), but in those deployments the channel properties are significantly different, being composed of a highly scattered environment around the user. That allows one single eNB to transmit several spatially different layers of data from one place to another.

The scattered environment that is the norm in conventional technology is far from the case with reflection-less free space communications to and from an aircraft. Hence, in order to utilize spatial diversity in ground-to-air communications, the different layers must be spatially separated at their source; that is, different nodes must transmit different layers, or alternatively different groups of nodes (e.g., groups of eNBs) must transmit different layers in which case the composition of each group of nodes is mutually exclusive of the composition of other groups of nodes.

In order to operate in this manner, the participating nodes must be coordinated and the layers adjusted in order for the aircraft to be able to accurately receive all transmission layers. Coordination includes properly timing transmissions from each node so that each transmission keeps the timing requirements imposed by the given system. For example, when OFDM signaling is used, each node's transmissions must comply within the required temporal delay of the cyclic prefix used in OFDM signaling. The coordination of timing is particularly important since free-space ground-to-air communications allows for significantly longer range communications than what is normally the case in ordinary land-based communications.

Furthermore, since aircraft velocities are substantially higher than velocities on the ground, the Doppler shift will be more pronounced in such an environment. This problem is exacerbated by the fact that communications from different nodes will include both positive and negative Doppler shifts depending on their locations relative to the aircraft and its direction. Hence there is a need for a coordinated a priori Doppler compensation in the nodes.

In addition to the above considerations, communications parameters such as modulation and coding scheme (MCS), rank, pilot patterns, beam directions and the like need to be coordinated and/or distributed in the case where parameters are based on aircraft transponder information that is not available to the node. Conventional nodes do not typically include the type of receiver equipment necessary to receive transponder broadcasts. In alternative embodiments, however, a node can have its own receiver for aircraft transponder information (e.g., an ADS-B receiver), and in those embodiments such nodes can derive the related information itself.

Figure 2:
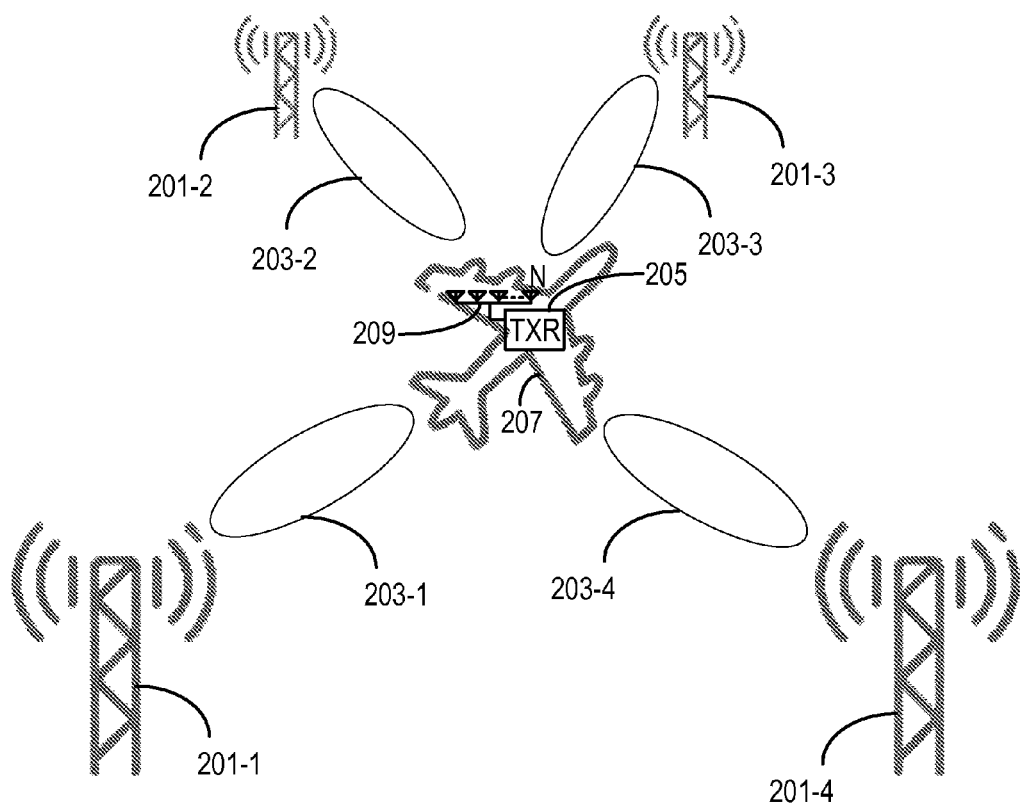
FIG. 2 illustrates how multiple line of sight beams, emanating from different terrestrially-located nodes and directed at a same aircraft, can be used to increase communication throughput to mobile communications equipment aboard the aircraft.

To illustrate an aspect of embodiments consistent with the invention, FIG. 2 depicts a plurality of nodes 201-1, 201-2, 201-3, 201-4 that each direct a respective line of sight beam 203-1, 203-2, 203-3, 203-4 at the same airborne mobile communication equipment 205 located in an aircraft 207. The beams 203-1, 203-2, 203-3, 203-4 resolved in the airborne equipment 205 by an antenna array 209 or a planar antenna array may multiply the communication throughput to the airborne equipment by a factor of from 2, 3, . . . N, where N is the number of antenna elements. In order for the airborne node 205 to optimally receive the spatial diversity transmission, the nodes 201-1, 201-2, 201-3, 201-4 must be synchronized with respect to transmission characteristics such as time delay and Doppler frequency shift. In addition, the interference from the other beams must be analyzed in order to compute the optimal set of nodes that will participate in the communication. For this reason, and in another aspect of embodiments consistent with the invention, there is a need for a master coordination node (MCN) that analyzes and distributes transmission parameters to the nodes 201-1, 201-2, 201-3, 201-4 for optimal transmission to the airborne mobile communication equipment 205. To facilitate an understanding of the information provided herein, the nodes 201-1, 201-2, 201-3, 201-4 (as well as their counterparts described throughout this disclosure), are referred to as "subordinate nodes", to distinguish them from the master coordination node that oversees how the subordinate nodes will communicate with the airborne mobile communication equipment 205.

Figure 3:
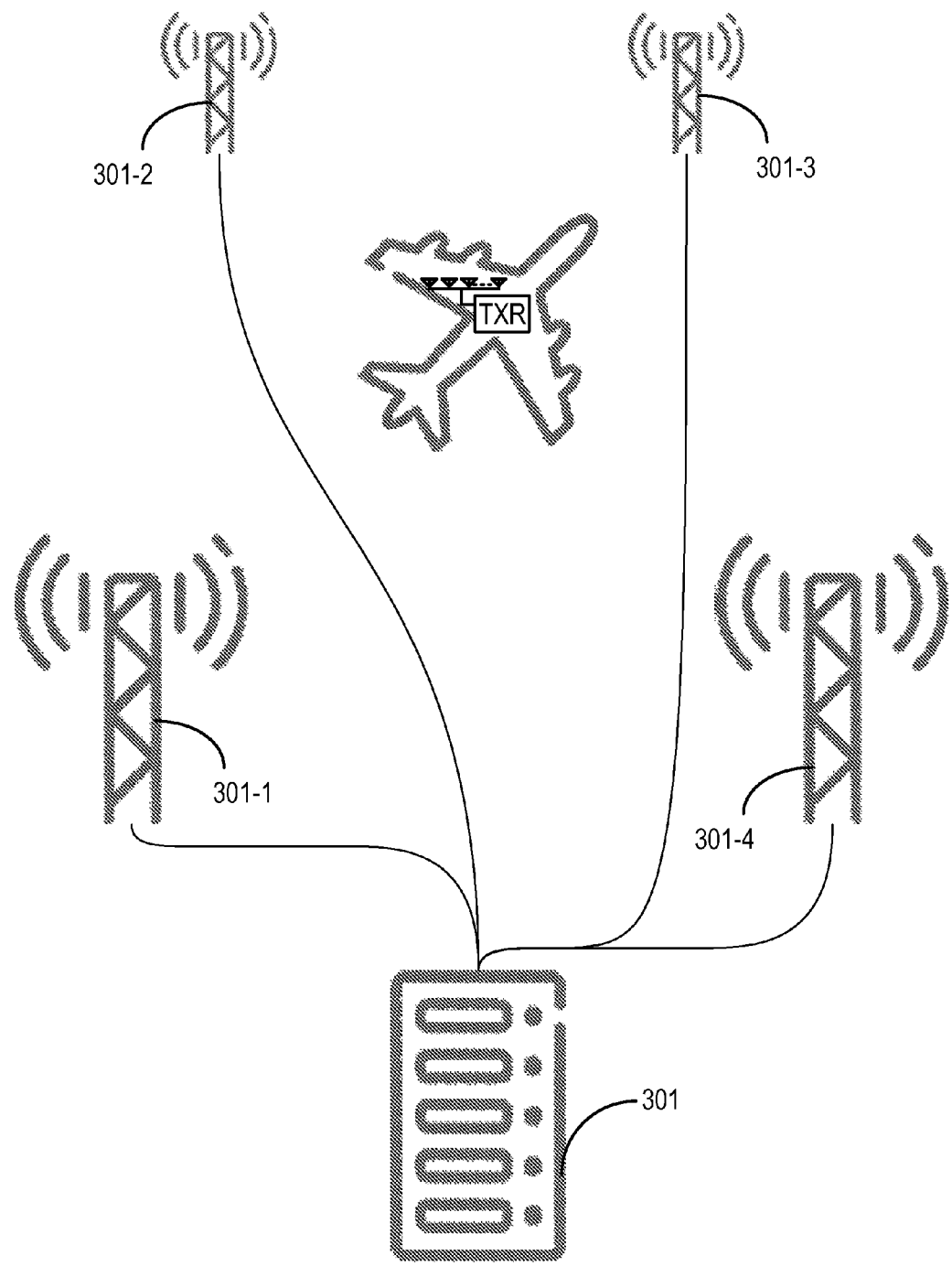
FIG. 3 depicts an arrangement of a master coordination node coupled to four subordinate nodes in an exemplary embodiment.

To further illustrate an exemplary embodiment that is consistent with the invention, FIG. 3 depicts an arrangement of a master coordination node 301 coupled to, in this example and without limitation, four subordinate nodes 303-1, 303-2, 303-3, and 303-4 (e.g., neighboring eNBs). The master coordination node 301 receives data from the subordinate nodes 303-1, 303-2, 303-3, and 303-4 regarding the link to the airborne mobile communication equipment. Such data may firstly include position and velocity data of the airborne node. In one embodiment such data may be obtained from an aircraft transponder (e.g., ADS-B OUT equipment), while in another embodiment it may be obtained indirectly from beam estimation by receiving pilot data from the airborne mobile communication equipment at the subordinate nodes and then identifying the intersection of the beams by triangulation.

Secondly, data received from the master coordination node 301 may further include Doppler shift information, timing information indicative of signal travel time between the mobile communication equipment and the subordinate node, beam directivity (which corresponds to a precoding matrix), SNR, mutual information (MI) or other transmission measures. Based on this information, and the location data, the master coordination node 301 decides:

which of the subordinate nodes 303-1, 303-2, 303-3, and 303-4 (at this stage, considered candidate subordinate nodes) are suitable for engaging in communications with the airborne mobile communication equipment, whether any already-selected subordinate nodes should be deselected, for example based on beam interference with another mobile communications equipment in another aircraft having the same trajectory, the likely capacity for each beam, for example by accounting for the interference from the other anticipated participating beams from other nodes, and the airborne node's ability to resolve beams. The MCN then informs the participating eNBs of their respective settings for an optimal coordinated transmission.

In some but not necessarily all embodiments, the master coordination node 301 also forwards layer data to the individual subordinate nodes 303-1, 303-2, 303-3, and 303-4, the layer data being intended for transmission to the mobile communication equipment aboard the aircraft. Alternatively, subordinate nodes 303-1, 303-2, 303-3, and 303-4 can receive layer data from another source.

In another aspect of some but not necessarily all embodiments, one or more of the subordinate nodes receives pilot signals from the airborne device, from which transmission measures such as SNR, beam directivity (precoding matrix), Doppler shift information, mutual information, and/or timing information indicative of signal travel time between the mobile communication equipment and the subordinate node are estimated. These transmission measures are then forwarded to the master communication node, where they are jointly analyzed with any like information received from other subordinate nodes. In response, the subordinate node receives transmission parameters from the master coordination node which are used by the subordinate node to optimally control transmission of layer data to the mobile communication equipment aboard the aircraft.

Further aspects of embodiments will now be described with reference to FIG. 4, which in one respect is a flow chart of steps/processes performed by master coordination node circuitry in accordance with some but not necessarily all exemplary embodiments consistent with the invention. In another respect, FIG. 4 can be considered to depict exemplary means 400 comprising the various illustrated circuitry (e.g., hard-wired and/or suitably programmed processor) configured to perform the described functions.

Figure 4:
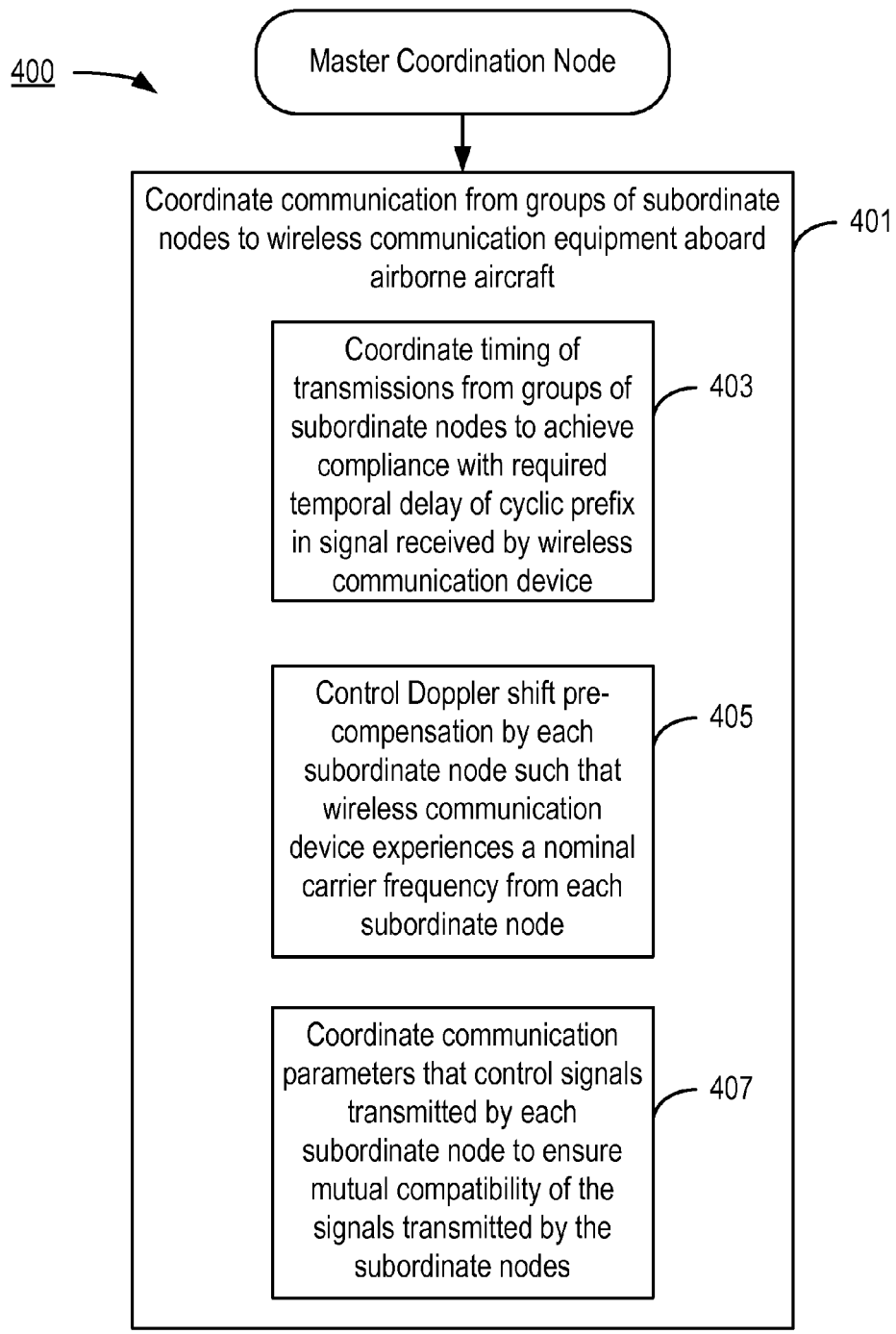
FIG. 4 is, in one respect, a flow chart of steps/processes performed by master coordination node circuitry in accordance with some but not necessarily all exemplary embodiments consistent with the invention.

The functionality illustrated in FIG. 4 is performed by a master coordination node for the purpose of providing cellular telecommunications system service to a mobile communication equipment aboard an aircraft that is airborne. The master coordination node operates as part of a terrestrial cellular telecommunications system that further comprises other network nodes. This functionality includes coordinating communication from a plurality of groups of subordinate nodes selected from the other network nodes such that each group of subordinate nodes communicates a different layer of data to the mobile communication equipment aboard the aircraft (step 401). Here, each group of subordinate nodes comprises one or more other network nodes; each group of subordinate nodes is mutually exclusive of other groups of subordinate nodes; and each of the groups of subordinate nodes transmits beam steered, Doppler shift compensated downlink signals directed at the aircraft.

The step of coordinating communication from the plurality of groups of subordinate nodes comprises coordinating timing of transmissions from the groups of subordinate nodes so as to have signals received by the mobile communication equipment from the groups of subordinate nodes keep within a required temporal delay of a cyclic prefix in the received signals (step 403).

Coordinating communication further includes controlling Doppler shift pre-compensation performed by each of the groups of subordinate nodes such that the mobile communication equipment aboard the aircraft experiences a nominal carrier frequency when receiving transmissions from each of the groups of subordinate nodes (step 405).

Coordinating communication still further includes coordinating communication parameters that control signals transmitted by each of the groups of subordinate nodes to ensure mutual compatibility of the signals transmitted by each of the groups of subordinate nodes (step 407).

Further aspects of embodiments will now be described with reference to FIG. 5, which in one respect is a flow chart of steps/processes performed by subordinate node circuitry in accordance with some but not necessarily all exemplary embodiments consistent with the invention. In another respect, FIG. 5 can be considered to depict exemplary means 500 comprising the various illustrated circuitry (e.g., hard-wired and/or suitably programmed processor) configured to perform the described functions.

Figure 5:
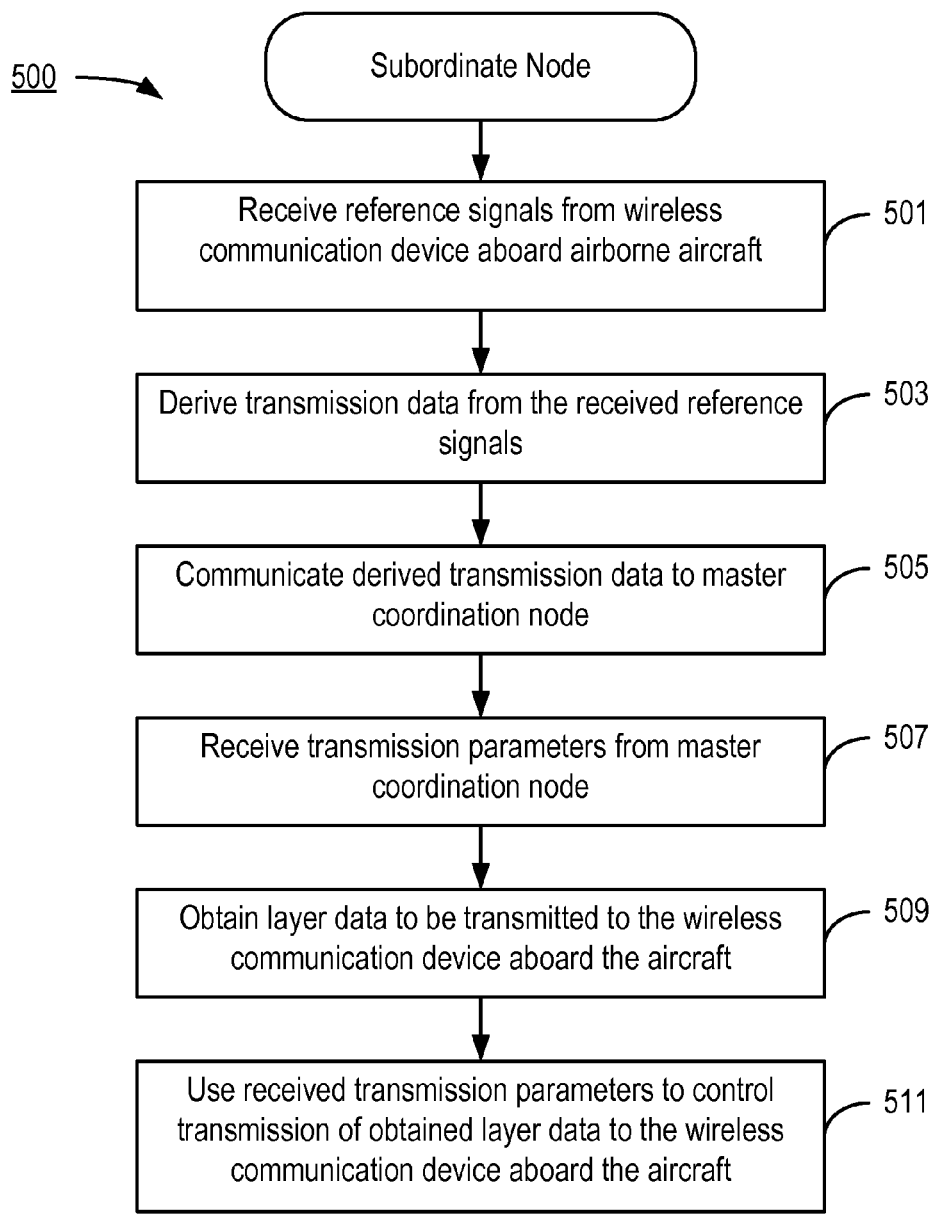
FIG. 5 is, in one respect, a flow chart of steps/processes performed by subordinate node circuitry in accordance with some but not necessarily all exemplary embodiments consistent with the invention.

The functionality illustrated in FIG. 5 is performed by a subordinate node for the purpose of communicating with a mobile communication equipment aboard an aircraft that is airborne. The subordinate node is part of a terrestrial cellular telecommunications system that further comprises other network nodes including a master coordinating node.

The functionality of the subordinate node includes receiving reference signals from the mobile communication equipment aboard the aircraft (step 501), and deriving transmission data from the received reference signals (step 503).

The derived transmission data is then communicated to the master coordination node 505), and in response, the subordinate node receives transmission parameters from the master coordination node (step 507).

The subordinate node also obtains layer data to be transmitted to the mobile communication equipment aboard the aircraft (step 509). The layer data can be supplied by the master coordination node, or by another source.

The subordinate node then uses the received transmission parameters to control transmission of the obtained layer data to the mobile communication equipment aboard the aircraft (step 511).

Figure 6:
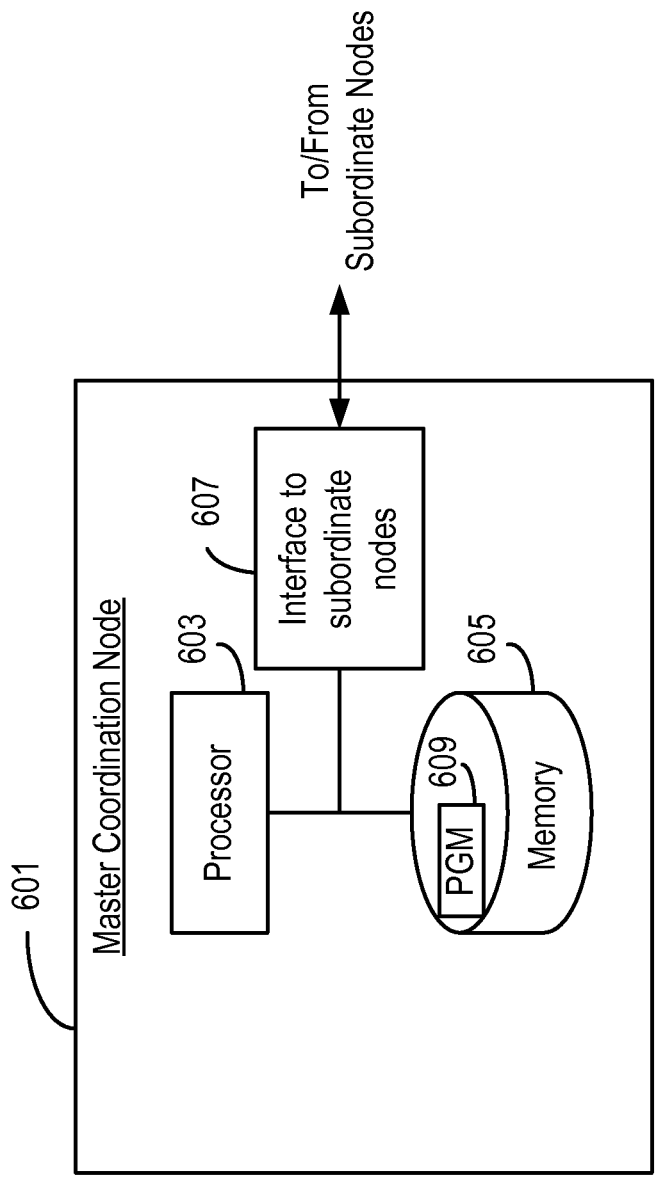
FIG. 6 is a block diagram of elements for carrying out various aspects of the invention related to the master coordination node.

Looking at further aspects of embodiments consistent with the invention, FIG. 6 is a block diagram of elements for carrying out various aspects of the invention related to the master coordination node. In particular, a master coordination node 601 (e.g., an eNB or other node configured to be capable of carrying out the functionality described above) includes circuitry configured to carry out any one or any combination of the various functions described above with respect to actions taken by the master coordination node. Such circuitry could, for example, be entirely hard-wired circuitry (e.g., one or more Application Specific Integrated Circuits—"ASICs"). Depicted in the exemplary embodiment of FIG. 6, however, is programmable circuitry, comprising a processor 603 coupled to one or more memory devices 605 (e.g., Random Access Memory, Magnetic Disc Drives, Optical Disk Drives, Read Only Memory, etc.) and to a network interface 607 that enables bidirectional communication with the subordinate nodes. The memory device(s) 605 store program means 609 (e.g., a set of processor instructions) configured to cause the processor 603 to control other node elements so as to carry out any of the aspects described above, such as but not limited to those described with reference to FIG. 4. The memory device(s) 605 may also store data (not shown) representing various constant and variable parameters as may be needed by the processor 603 when carrying out its functions such as those specified by the program means 609.

Figure 7:
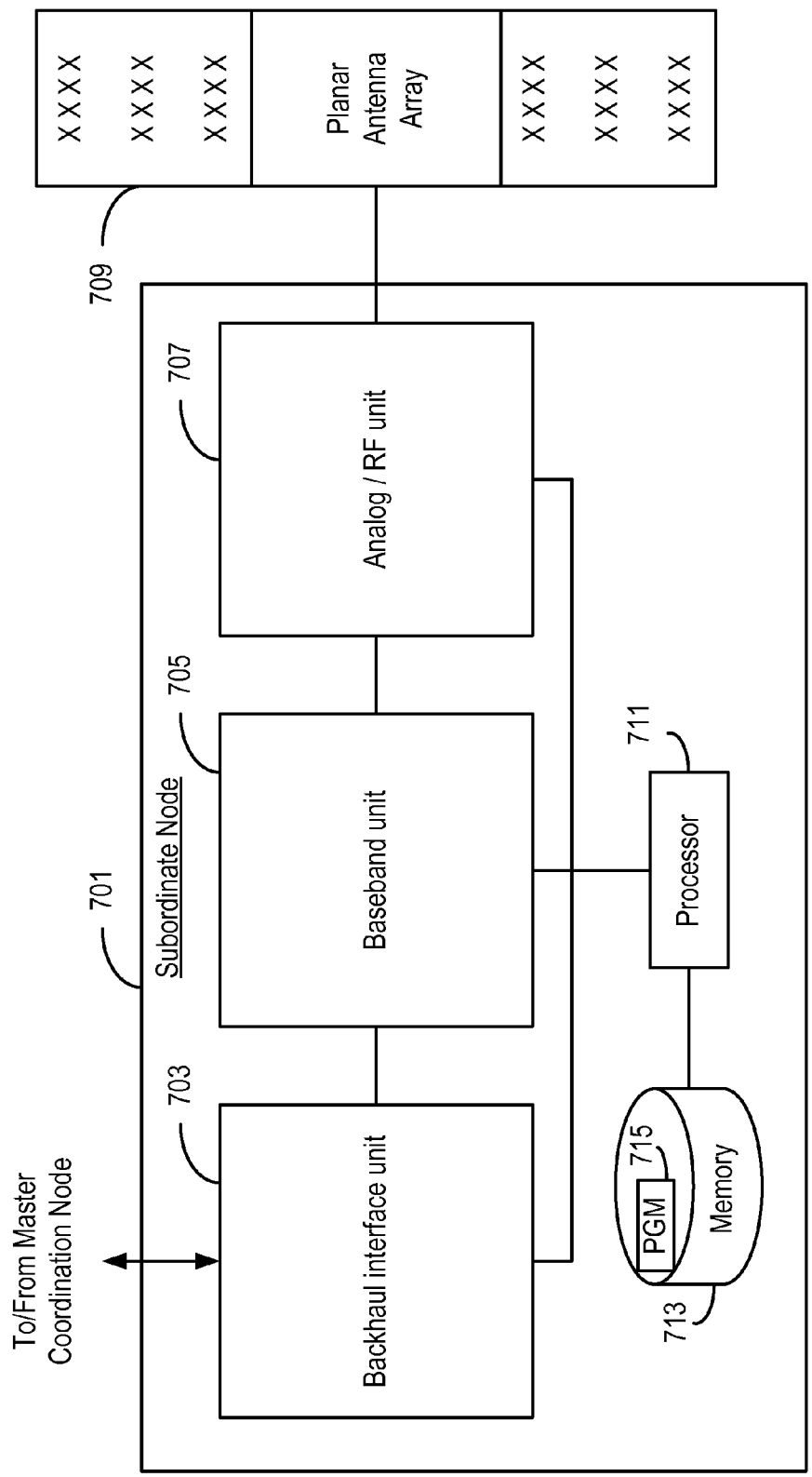
FIG. 7 is a block diagram of elements for carrying out various aspects of the invention related to the subordinate node.

Looking at further aspects of embodiments consistent with the invention, FIG. 7 is a block diagram of elements for carrying out various aspects of the invention related to a subordinate node. In particular, a subordinate node 701, for example when embodied as an eNB, includes circuitry/components that carry out "base station" functions, such as a backhaul interface unit 703, a baseband unit 705, and an analog/RF unit 707 connected to a planar antenna array 709.

But in addition, a subordinate node 701 configured to carry out the various inventive aspects described herein includes circuitry configured to carry out any one or any combination of the various functions described above with respect to actions taken by the subordinate node. Such circuitry could, for example, be entirely hard-wired circuitry (e.g., one or more Application Specific Integrated Circuits—"ASICs"). Depicted in the exemplary embodiment of FIG. 7, however, is programmable circuitry, comprising a processor 711 coupled to one or more memory devices 713 (e.g., Random Access Memory, Magnetic Disc Drives, Optical Disk Drives, Read Only Memory, etc.) and to the backhaul interface unit 703, the baseband unit 705, and the analog/RF unit 707, these connections being for the purpose of controlling the functionality of the subordinate node 701. The memory device(s) 713 store program means 715 (e.g., a set of processor instructions) configured to cause the processor 711 to control other node elements so as to carry out any of the aspects described above, such as but not limited to those described with reference to FIG. 5. The memory device(s) 713 may also store data (not shown) representing various constant and variable parameters as may be needed by the processor 711 when carrying out its functions such as those specified by the program means 715.

The various embodiments consistent with the invention provide an affordable and efficient means to provide communication to an in-flight device acting as for example, a relay or access point (AP) on an aircraft. These embodiments provide for substantially increased data rates for wireless equipment aboard the aircraft. These advantages are not limited only to uplink transmissions. To the contrary, the same principles, including the use of beams directed at the moving aircraft, can be used in both the uplink and downlink directions to enable high rate data exchanges both to and from one or more mobile communication devices aboard an aircraft.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of providing cellular telecommunications system service to a mobile communication equipment aboard a first aircraft that is airborne, wherein the method is performed by a master coordination node of a terrestrial cellular telecommunications system that further comprises other network nodes, the method comprising:

coordinating communication from a plurality of groups of subordinate nodes selected from the other network nodes such that each group of subordinate nodes communicates a different layer of data to the mobile communication equipment aboard the first aircraft, wherein:

each group of subordinate nodes comprises one or more other network nodes;

each group of subordinate nodes is mutually exclusive of other groups of subordinate nodes; and each of the groups of subordinate nodes transmits beam steered, Doppler shift compensated downlink signals directed at the first aircraft; and wherein coordinating communication from the plurality of groups of subordinate nodes comprises:

coordinating timing of transmissions from the groups of subordinate nodes so as to have signals received by the mobile communication equipment from the groups of subordinate nodes keep within a required temporal delay of a cyclic prefix in the received signals;

controlling Doppler shift pre-compensation performed by each of the groups of subordinate nodes such that the mobile communication equipment aboard the first aircraft experiences a nominal carrier frequency when receiving transmissions from each of the groups of subordinate nodes; and coordinating communication parameters that control signals transmitted by each of the groups of subordinate nodes to ensure mutual compatibility of the signals transmitted by each of the groups of subordinate nodes.

2. The method of claim 1, comprising:
determining whether a candidate other network node will be a member of any of the groups of subordinate nodes based on a predicted level of interference caused by transmissions to the mobile communication equipment from the candidate other network node and affecting other transmissions directed to the mobile communication equipment.

3. The method of claim 1, comprising:
determining whether a candidate other network node will be dropped as a member of at least one of the groups of subordinate nodes based on an amount of beam interference with another mobile communication equipment located in a second aircraft travelling in a same trajectory as the first aircraft.

4. The method of claim 1, comprising:
determining whether a candidate other network node will be a member of any of the groups of subordinate nodes based on first aircraft location data, and transmission measures pertaining to the mobile communication equipment and reported by the candidate other network node.

5. The method of claim 4, wherein the transmission measures include any one or more of:
Doppler shift information, timing information indicative of signal travel time between the mobile communication equipment and the candidate other network node, precoding matrix, signal-to-noise ratio, and mutual information, all pertaining to the mobile communication equipment aboard the first aircraft.

6. The method of claim 1, comprising:
determining whether a candidate other network node will be a member of any of the groups of subordinate nodes based on a likely capacity of a beam transmitted by the candidate other network node to the mobile communication equipment aboard the first aircraft.

7. The method of claim 1, wherein coordinating communication from the plurality of groups of subordinate nodes comprises:
receiving data from each of the groups of subordinate nodes, including position and velocity data of the first aircraft as perceived by the groups of subordinate nodes; and
using the received data to adjust the coordinating of timing of transmissions from the groups of subordinate nodes, the controlling of Doppler shift pre-compensation performed by each of the groups of subordinate nodes, and the coordinating of communication parameters that control signals transmitted by each of the groups of subordinate nodes.

8. The method of claim 7, wherein the data received from each of the groups of subordinate nodes comprises any one or more of:
Doppler shift information, timing information indicative of signal travel time between the mobile communication equipment and one of the other network nodes, precoding matrix, signal-to-noise ratio, and mutual information.

9. The method of claim 7, wherein using the received data to adjust the coordinating of timing of transmissions from the groups of subordinate nodes, the controlling of Doppler shift pre-compensation performed by each of the groups of subordinate nodes, and the coordinating of communication parameters that control signals transmitted by each of the groups of subordinate nodes comprises:
deriving, from the received data, the communication parameters for each of the other network nodes that make up the groups of subordinate nodes; and
communicating to each of the other network nodes that make up the groups of subordinate nodes, the communication parameters for said each of the other network nodes that make up the groups of subordinate nodes,
wherein the communication parameters comprise one or more of: precoding matrix, Doppler shift, and timing information for controlling the timing of transmissions between air and ground.

10. The method of claim 1, wherein the derived communication parameters comprise any one or more of:
Multiple Input/Multiple Output (MIMO) rank, Modulation and Coding Scheme (MCS), precoding matrix, and pilot pattern parameters.

11. The method of claim 1, further comprising:
forwarding different layer data for transmission to the mobile communication equipment to respective ones of the other network nodes that make up the groups of subordinate nodes.

12. The method of claim 1, comprising:
using information about beam resolution at a location of the first aircraft to select a subset of the groups of subordinate nodes; and
causing only the subset of the groups of subordinate nodes to transmit signals directed to the mobile communication equipment aboard the first aircraft.

13. A master coordination node for providing cellular telecommunications system service to a mobile communication equipment aboard a first aircraft that is airborne, wherein the master coordination node is configured to operate in a terrestrial cellular telecommunications system that further comprises other network nodes, the master coordination node comprising:

circuitry configured to coordinate communication from a plurality of groups of subordinate nodes selected from the other network nodes such that each group of subordinate nodes communicates a different layer of data to the mobile communication equipment aboard the first aircraft, wherein:
  each group of subordinate nodes comprises one or more other network nodes;
  each group of subordinate nodes is mutually exclusive of other groups of subordinate nodes; and
  each of the groups of subordinate nodes transmits beam steered, Doppler shift compensated downlink signals directed at the first aircraft; and wherein the circuitry configured to coordinate communication from the plurality of groups of subordinate nodes comprises:
  circuitry configured to coordinate timing of transmissions from the groups of subordinate nodes so as to have signals received by the mobile communication equipment from the groups of subordinate nodes keep within a required temporal delay of a cyclic prefix in the received signals;

circuitry configured to control Doppler shift pre-compensation performed by each of the groups of subordinate nodes such that the mobile communication equipment aboard the first aircraft experiences a nominal carrier frequency when receiving transmissions from each of the groups of subordinate nodes; and circuitry configured to coordinate communication parameters that control signals transmitted by each of the groups of subordinate nodes to ensure mutual compatibility of the signals transmitted by each of the groups of subordinate nodes.

* * * * *